United States Patent [19]

Komine et al.

[11] 4,454,202

[45] Jun. 12, 1984

[54] MAGNETIC RECORDING MEDIUM

[75] Inventors: Shigeo Komine; Kazuhiko Morita; Nobuo Tsuji, all of Kanagawa, Japan

[73] Assignee: Fuji Photo Film Co., Ltd., Kanagawa, Japan

[21] Appl. No.: 315,555

[22] Filed: Oct. 27, 1981

[30] Foreign Application Priority Data

Oct. 27, 1980 [JP] Japan ................................ 55-150549

[51] Int. Cl.³ .............................................. G11B 5/70
[52] U.S. Cl. .............................. 428/423.1; 252/62.54; 360/134; 360/135; 360/136; 427/128; 428/423.7; 428/413; 428/480; 428/694; 428/900; 428/522
[58] Field of Search ............... 428/900, 694, 692, 695, 428/423.1, 423.7, 413, 480, 522; 252/62.54; 360/134–136; 427/128

[56] References Cited

U.S. PATENT DOCUMENTS

| | | | |
|---|---|---|---|
| 3,320,090 | 5/1967 | Graubart | 428/425.9 |
| 3,840,400 | 10/1974 | Yamada et al. | 428/413 |
| 3,911,196 | 10/1975 | Navidad | 428/900 |
| 4,259,392 | 3/1981 | Suzuki | 428/694 |
| 4,307,154 | 12/1981 | Hosaka et al. | 428/900 |
| 4,329,398 | 5/1982 | Hosufu et al. | 428/694 |
| 4,340,644 | 7/1982 | Otu et al. | 428/694 |
| 4,357,391 | 11/1982 | Hosaka | 428/694 |
| 4,368,238 | 1/1983 | Somezawa | 428/694 |

*Primary Examiner*—Ellis P. Robinson
*Attorney, Agent, or Firm*—Sughrue, Mion, Zinn, Macpeak & Seas

[57] ABSTRACT

A magnetic recording medium having a magnetic paint applied to a base is disclosed. The magnetic paint contains a three-component binder which comprises 30 to 70% of polyurethane having a terminal OH group, 10 to 50% of an epichlorohydrin/diphenylolpropane polycondensate and 10 to 50% of a vinyl chloride/vinyl acetate copolymer, vinyl chloride/vinyl acetate/maleic acid copolymer or vinyl chloride/vinyl acetate/vinyl alcohol copolymer, the percentage being based on the weight of the binder.

7 Claims, No Drawings

MAGNETIC RECORDING MEDIUM

FIELD OF THE INVENTION

This invention relates to a magnetic recording medium, and more particularly, to the composition of a novel binder for use in a magnetic recording medium.

BACKGROUND OF THE INVENTION

Conventional magnetic recording media are made of a magnetic recording layer formed on a plastic film base such as polyethylene terephthalate, acetyl cellulose or polyvinyl chloride. For the purposes of providing a magnetic recording medium having good electro-to-magnetic conversion characteristics and physical properties typified by repeatedly running stability and good adhesion to the base, the magnetic layer contains a binder, such as polyvinyl chloride/vinyl acetate copolymer, polybutyl acrylate, nitrocellulose, cellulose propionate, cellulose acetate butyrate, ethyl cellulose, polyvinyl acetate, styrene-butadiene copolymer, vinyl fluoride resin, chlorinated polypropylene, polyvinyl butyral, thermoplastic urethane resin, chlorinated vinyl chloride/acrylic ester copolymer, vinyl acetate/ethylene copolymer, phenolic resin, epoxy resin, polyamide resin, melamine-formaldehyde resin, urea-formaldehyde resin, alkyd resin, silicone resin, and modified products thereof. These binders may be used independently or in admixture. A two-component system made of polyurethane and epoxy or vinyl chloride acetate resin, as well as a system wherein a curing agent is added to this two-component system are well known as binders capable of providing a magnetic coating having good wear resistance and good adhesion to the base, as described in Japanese Patent Application (OPI) Nos. 65203/74, 15202/74, 51706/78 and 1645/80 (the symbol "OPI" as used herein means an unexamined published Japanese patent application). But because of the relatively high molecular weight of polyurethane, ferromagnetic particles cannot easily be dispersed in these binders. Furthermore, the polyurethane/vinyl chloride acetate copolymer system is not expected to form a highly cross-linked network structure by curing. Accordingly, the resulting magnetic recording medium does not necessarily have adequate thermal and humid resistances and durability. The polyurethane/epoxy system does not assure satisfactory recording or reproduction due to poor orientation of the magnetic particles that are not uniformly dispersed in this system.

SUMMARY OF THE INVENTION

Therefore, one object of this invention is to provide a magnetic recording medium having high thermal and humid resistances.

Another object is to provide a magnetic recording medium having good stability of a tape running property in the repeatedly use.

Still another object is to provide a binder for a magnetic recording medium that forms a magnetic layer wherein magnetic particles are uniformly dispersed and which has good adhesion to the base.

These objects of this invention can be achieved by using a magnetic paint composition that contains a three-component binder comprising (1) a polyurethane resin, (2) an epichlorohydrin/diphenylolpropane polycondensate, and (3) a vinyl chloride/vinyl acetate copolymer, vinyl chloride/vinyl acetate/maleic acid copolymer or vinyl chloride/vinyl acetate/vinyl alcohol copolymer.

DETAILED DESCRIPTION OF THE INVENTION

The polyurethane resin used in this invention must have a terminal OH group. Typical commercial products meeting this requirement include Nipporan 3022, 5032, and 5033 of Nippon Polyurethane Industry Co., Ltd., Esten 5701, 5702 and 5715 of Goodrich Co., and equivalents thereof.

Useful commercial examples of the vinyl chloride/vinyl acetate copolymer, vinyl chloride/vinyl acetate/maleic acid copolymer and vinyl chloride/vinyl acetate/vinyl alcohol copolymer includes VYHH, VMCH and VAGH of Union Carbide Corp., Denka Vinyl 1000C and 1000G of Denki Kagaku Kogyo K.K. and Esrekku M and Esrekku A of Sekisui Chemical Co., Ltd. The VMCH and Esrekku M are preferred because a binder containing them is capable of forming a uniform dispersion of magnetic particles. The preferred molecular weight of these copolymers are a range of from about $2 \times 10^5$ to about $8 \times 10^5$. The preferred constitution ratios (molar ratio) of the vinyl chloride/vinyl acetate copolymers, vinyl chloride/vinyl acetate/maleic acid copolymer and vinyl chloride/vinyl acetate/vinyl alcohol copolymer are about 70 to 90/10 to 30, about 65 to 89/10 to 30/1 to 5 and about 60 to 89/10 to 30/1 to 10, respectively.

Useful commercial examples of the epichlorohydrin/diphenylolpropane polycondensate include Epikote 1001, 1004, 1007 and 1009 of Shell International Chemicals Corp., compounds of higher molecular weight that are referred to as phenoxy resin, e.g., PKHH of Union Carbide Corp., and Pheno-tohto YP-50-EK-35 of Toto Kasei K.K. Specifically, PKHH and YP-50-EK-35 are preferred since they provide a magnetic layer having high thermal and humid resistances and stability of the tape running property in repeatedly use.

The binder used in this invention preferably comprises 30 to 70 wt% of polyurethane, 10 to 50 wt% of epichlorohydrin/diphenylolpropane polycondensate and 10 to 50 wt% of vinyl chloride acetate copolymer. If the polyurethane content is less than 30%, the resulting magnetic layer has poor adhesion to the base and low wear resistance. If the polyurethane content is more than 70%, the stability of the tape running property in the repeatedly use is reduced due, for example, to blocking of the magnetic head. If the content of epichlorohydrin/diphenylolpropane polycondensate is less than 10%, no adequate thermal and humid resistances are achieved, and if the content is more than 50%, the resulting magnetic layer has poor adhesion to the base and it is not possible to obtain a good dispersion of magnetic particles. If the content of vinyl chloride acetate copolymer is less than 10%, poor dispersion of magnetic particles will result in low electromagnetic properties. If the content of the vinyl chloride acetate copolymer is more than 50%, the thermal and humid resistances of the magnetic recording medium as typified by adhesion of the magnetic layer to the base are decreased.

According to this invention, a magnetic paint containing a binder of the three-component system described above is spread or otherwise applied onto the base and dried to form a magnetic recording medium. A magnetic tape thus produced has good physical properties, electromagnetic properties and durability as illustrated by high thermal and humid resistances, good adhesion to the base, good dispersion of magnetic particles and high stability of a tape running property in the repeatedly use.

This invention is now described in greater detail by reference to the following examples and comparative examples which are given here for illustrative purposes only and are by no means intended to limit the scope of the invention.

EXAMPLE 1

A composition of the following formulation was well stirred in a ball mill. After adding 20 parts by weight of a polyisocyanate ("Colonate L-75") as a curing agent, the mixture was further stirred and spread on a polyester base to give a dry thickness of 10μ.

|  | parts by weight |
|---|---|
| $\gamma$-$Fe_2O_3$ | 400 |
| Dispersant | 6 |
| Polyurethane resin (Nipporan 3022) | 60 |
| Epichlorohydrin/diphenylolpropane polycondensate (PKHH) | 20 |
| Vinyl chloride/vinyl acetate/maleic acid copolymer (VMCH) | 20 |
| Lubricant | 5 |
| Carbon | 30 |
| Methyl ethyl ketone (MEK) | 500 |
| Methyl isobutyl ketone (MIBK) | 200 |
| Cyclohexane | 200 |

The base with the magnetic coating was supercalendered to mold and process the surface, cured at 60° C. for 24 hours and slit into a magnetic tape sample of a predetermined width.

EXAMPLES 2 TO 5 AND COMPARATIVE EXAMPLES 1 TO 4

Magnetic tape samples were prepared as in Example 1 except that the composition of the binder was varied as indicated in Table 1.

In the "thermal and humid resistances test", the magnetic tape wound around a glass tube was left to stand at 60° C. and 80% R.H. (relative humidity), and allowed to cool to room temperature and checked to see if it stuck to the glass tube. The "adhesion" is the peel strength measured by peeling the magnetic coating from the base at an angle of 180° and is represented by gram per ¼ inch. In the "stability of a tape running property in repeatedly use" test, an endless magnetic tape was caused to run 2,000 times at 2 m/sec. The sticking of the tape to the head is represented by the static friction coefficient at start-up time, with the virgin tape having a static friction coefficient of about 100 g.

As is clear from Table 1, the tape samples prepared in Examples 1 to 5 according to this invention obtained improved results (i.e., good or possible result for a practical use) in many respects, e.g., squareness ratio, thermal and humid resistances, adhesion, and stability of a tape running property in repeatedly use. None of the samples prepared in Comparative Examples 1 to 4 met all requirements for good tape, i.e., these comparison samples obtained at best one bad result for a practical use, respectively. Therefore, these comparison samples are not considered completely suitable for a practical use. In Examples 1 to 5 and Comparative Examples 1 to 4, it can be seen that the tape samples of Example 1, Example 4, Example 2, Example 3 and Example 5 are preferred in this order and the tape samples of Comparative Examples 1 to 4 are inferior as compared with the tape samples prepared according to this invention.

Further, the curing agent is preferably used in an amount of 10 to 30 parts by weight per 100 parts by weight of the binder. If it is used in less than 10 parts by weight, no great cross-linking effect is expected, and if the content is more than 30 parts by weight, the resulting magnetic coating has very low adhesion to the base.

As described in the foregoing, the magnetic recording medium according to this invention is superior as compared with the medium using the conventional binder with respect to dispersability of magnetic particles (it is reflected typically in squareness ratio), thermal and humid resistances, adhesion to the base, and stability of a tape running property in repeatedly use.

While the invention has been described in detail and with reference to specific embodiments thereof, it will be apparent to one skilled in the art that various changes and modifications can be made therein without departing from the spirit and scope thereof.

What is claimed is:

TABLE 1

| Run No. | Composition of Binder | | | Performance | | | |
|---|---|---|---|---|---|---|---|
|  | Polyurethane | Epoxy Resin | Vinyl Chloride Acetate Resin | Squareness Ratio | Thermal and Humid Resistances Test | Adhesion (g) | Stability of a Tape Running Property in Repeatedly Use (g) |
| Example 1 | 60 | 20 | 20 | 0.85 (o) | Not stuck | 255 (o) | 150 (o) |
| Example 2 | 45 | 25 | 30 | 0.84 (o) | " | 170 (Δ) | 120 (o) |
| Example 3 | 50 | 40 | 10 | 0.83 (Δ) | " | 150 (Δ) | 180 (o) |
| Example 4 | 50 | 10 | 40 | 0.84 (o) | " | 255 (o) | 210 (o) |
| Example 5 | 30 | 35 | 35 | 0.83 (Δ) | " | 160 (Δ) | 280 (Δ) |
| Comparative Example 1 | 60 | 40 | — | 0.70 (x) | Not stuck | 215 (o) | 380 (Δ) |
| Comparative Example 2 | 40 | 60 | — | 0.68 (x) | " | 140 (Δ) | 410 (x) |
| Comparative Example 3 | 60 | — | 40 | 0.83 (Δ) | Stuck | 265 (o) | 570 (x) |
| Comparative Example 4 | 40 | — | 60 | 0.84 (o) | " | 190 (Δ) | 530 (x) |

Note:
o, Δ and x are "good", "possible" and "bad" for a practical use, respectively.

1. A magnetic recording medium, comprising:
a base; and
a magnetic paint applied to a surface of said base, said magnetic paint comprising a three-component binder consisting essentially of 30 to 70% of polyurethane having a terminal OH group, 10 to 50% of an epichlorohydrin/diphenylolpropane polycondensate and 10 to 50% of a copolymer selected from the group consisting of a vinyl chloride/vinyl acetate copolymer, vinyl chloride/vinyl acetate/maleic acid copolymer and vinyl chloride/vinyl acetate/vinyl alcohol copolymer, the percentages being based on the weight of the binder.

2. A magnetic recording medium as claimed in claim 1, wherein said copolymer is vinyl chloride/vinyl acetate copolymer.

3. A magnetic recording medium as claimed in claim 1, wherein said copolymer is vinyl chloride/vinyl acetate/maleic acid copolymer.

4. A magnetic recording medium as claimed in claim 1, wherein said copolymer is vinyl chloride/vinyl acetate/vinyl alcohol copolymer.

5. A magnetic recording medium as claimed in claim 1, further comprising a curing agent.

6. A magnetic recording medium as claimed in claim 5, wherein said curing agent is added in an amount of 10 to 30 parts by weight.

7. A magnetic recording medium as claimed in claim 1 wherein said 3-component binder consists of said polyurethane, said polycondensate and said copolymer.

* * * * *